(12) United States Patent
Pruessing et al.

(10) Patent No.: US 12,176,140 B2
(45) Date of Patent: Dec. 24, 2024

(54) METHOD FOR CARRYING OUT A SWITCHOVER OF AN ON-LOAD TAP CHANGER USING A DRIVE SYSTEM, AND DRIVE SYSTEM FOR AN ON-LOAD TAP CHANGER

(71) Applicant: Maschinenfabrik Reinhausen GmbH, Regensburg (DE)

(72) Inventors: Kathrin Pruessing, Regensburg (DE); Michael Schmeisser, Regensburg (DE); Juergen Schimbera, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 436 days.

(21) Appl. No.: 17/611,184

(22) PCT Filed: Apr. 23, 2020

(86) PCT No.: PCT/EP2020/061283
§ 371 (c)(1),
(2) Date: Nov. 15, 2021

(87) PCT Pub. No.: WO2020/229123
PCT Pub. Date: Nov. 19, 2020

(65) Prior Publication Data
US 2022/0216005 A1 Jul. 7, 2022

(30) Foreign Application Priority Data
May 15, 2019 (DE) .................. 10 2019 112 715.7

(51) Int. Cl.
*H01F 29/04* (2006.01)
*H01H 9/00* (2006.01)
*H02K 7/00* (2006.01)

(52) U.S. Cl.
CPC ........... *H01F 29/04* (2013.01); *H01H 9/0027* (2013.01); *H02K 7/003* (2013.01)

(58) Field of Classification Search
CPC ........ H01F 29/04; H01H 3/26; H01H 9/0027; H01H 2003/266; H02K 7/003
See application file for complete search history.

(56) References Cited

U.S. PATENT DOCUMENTS

| | | | |
|---|---|---|---|
| 5,736,827 A | 4/1998 | Dohnal et al. | |
| 2011/0181971 A1* | 7/2011 | Campbell | G02B 5/045 |
| | | | 83/875 |

(Continued)

FOREIGN PATENT DOCUMENTS

| | | |
|---|---|---|
| DE | 4214431 A1 | 11/1993 |
| DE | 202010011521 U1 | 11/2011 |

(Continued)

*Primary Examiner* — Gary A Nash
(74) *Attorney, Agent, or Firm* — LEYDIG VOIT & MAYER LTD.

(57) ABSTRACT

A method carries out a switchover of an on-load tap-changer using a drive system. The drive system includes at least one motor which acts on a drive shaft, a control device and an encoder system which is directly or indirectly coupled to the drive shaft. The method includes receiving a signal for switching the on-load tap-changer from the control device; determining by the control device whether switching to a current tap was performed from an upward or downward direction, and whether switching will be performed to a next tap in the upward or downward direction; selecting, on the basis of the determination, one of a plurality of travel profiles for the drive system of the on-load tap-changer, on the basis of which the switchover is carried out; and carrying out and monitoring the switchover by the drive system according to the selected travel profile.

20 Claims, 4 Drawing Sheets

(56) References Cited

U.S. PATENT DOCUMENTS

2013/0206555 A1    8/2013    Donhauser et al.
2014/0167529 A1    6/2014    Teising et al.

FOREIGN PATENT DOCUMENTS

| EP | 1884965 A1 * | 2/2008 | ............ H01F 29/04 |
| WO | WO-0036621 A1 * | 6/2000 | ............ H01H 33/36 |
| WO | 2008024048 A1 | 2/2008 | |
| WO | WO-2012135209 A1 * | 10/2012 | ............ H01F 29/04 |

* cited by examiner

METHOD FOR CARRYING OUT A SWITCHOVER OF AN ON-LOAD TAP CHANGER USING A DRIVE SYSTEM, AND DRIVE SYSTEM FOR AN ON-LOAD TAP CHANGER

CROSS REFERENCE TO RELATED APPLICATIONS

This application is a U.S. National Phase application under 35 U.S.C. § 371 of International Application No. PCT/EP2020/061283, filed on Apr. 23, 2020, and claims benefit to German Patent Application No. DE 10 2019 112 715.7, filed on May 15, 2019. The International Application was published in German on Nov. 19, 2020 as WO 2020/229123 A1 under PCT Article 21(2).

FIELD

The invention relates to a method for carrying out a switchover of an on-load tap-changer using a drive system. Furthermore, the invention relates to a drive system for an on-load tap-changer for carrying out the method according to the invention.

BACKGROUND

A drive for an on-load tap-changer is known, for example, from the German utility model specification DE °20 2010 011 521 U1. A motor is arranged in this on-load tap-changer drive and is rigidly connected to the corresponding on-load tap-changers via linkages. The motor is actuated by means of hard wiring, i.e., the motor is switched on or off by actuation of motor contactors. The drive shaft then actuates the on-load tap-changers. Once assembled, nothing can be changed on the drive. This makes the drive rigid and inflexible. The simplest adjustments require complex conversions.

On-load tap-changers are usually used for controlling voltage in different transformers. A drive system is used to actuate the on-load tap-changer. A motor arranged on the transformer housing is connected to the on-load tap-changer via a linkage. The motor is supplied with power by the actuation of electromechanical contactors. Depending on the wiring, the motor is actuated in such a way that its drive shaft rotates either in one direction or the other. This type of actuation is rigid and therefore inflexible.

SUMMARY

In an embodiment, the present invention provides a method for carrying out a switchover of an on-load tap-changer using a drive system, the drive system including at least one motor which acts on a drive shaft, a control device and an encoder system which is directly or indirectly coupled to the drive shaft. The method includes receiving a signal for switching the on-load tap-changer from the control device; determining by means of the control device whether switching to a current tap was performed from an upward direction or downward direction, and whether switching will be performed to a next tap in the upward direction or downward direction; selecting, on the basis of the determination, one of a plurality of travel profiles for the drive system of the on-load tap-changer, on the basis of which the switchover is carried out; and carrying out and monitoring the switchover by means of the drive system according to the selected travel profile.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
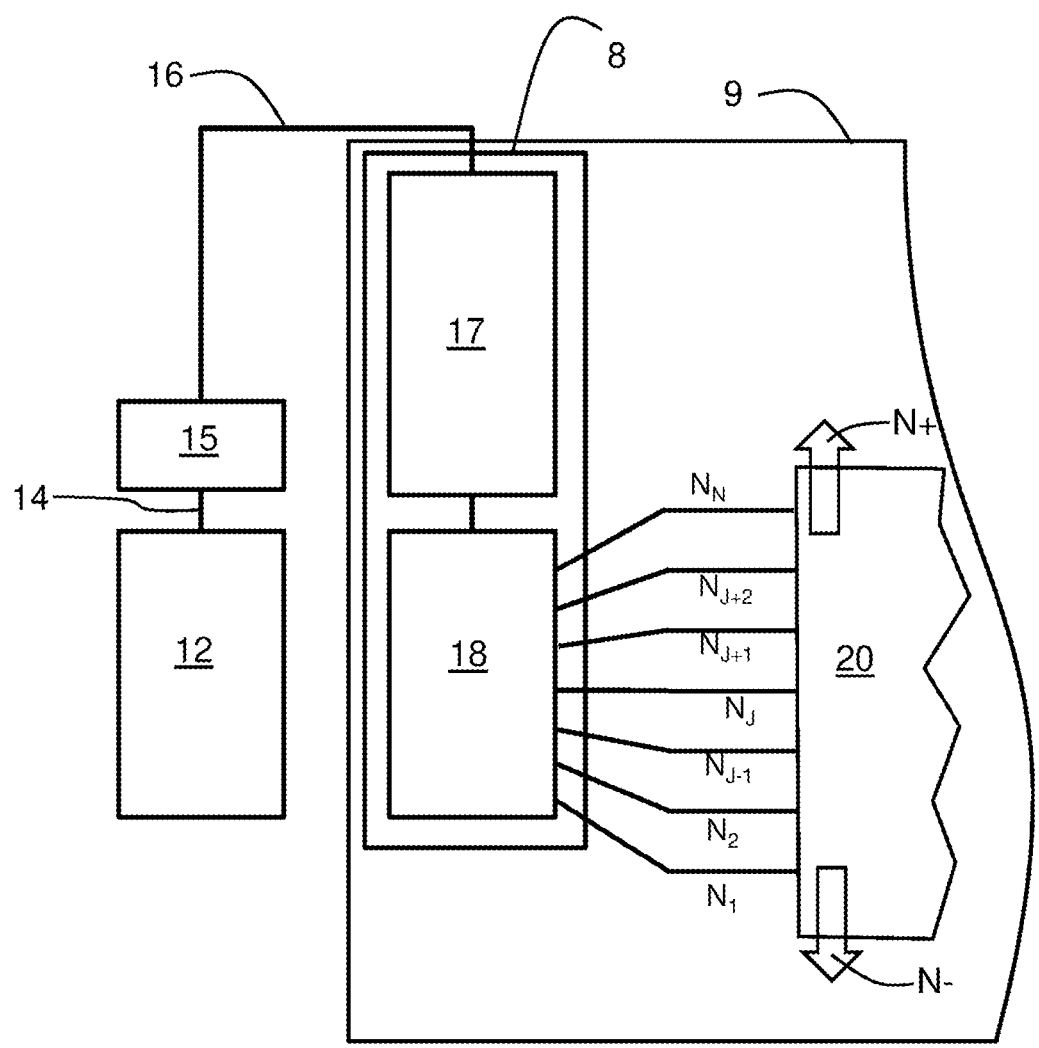
FIG. 1 is an exemplary drive for an on-load tap-changer, which drive can be used to switch between the different taps of a transformer.

Various embodiments of the present invention provide an improved concept for driving an on-load tap-changer, by means of which the flexibility of operation of the on-load tap-changer and the safety when carrying out a switchover of the taps are increased. Exemplary embodiments of the present invention provide a drive system comprising at least one motor which acts on a drive shaft. A control device and an encoder system are provided, wherein the encoder system is directly or indirectly coupled to the drive shaft.

Exemplary embodiments of the present invention achieve advantages by a method for carrying out a switchover of an on-load tap-changer using a drive system.

Exemplary embodiments of the present invention provide a drive system for an on-load tap-changer, by means of which drive system the flexibility of operation of the on-load tap changer and the safety when carrying out a switchover of the taps are increased.

In an exemplary embodiment, a drive system is provided for carrying out the method according to the invention for switchover of an on-load tap-changer. The drive system comprises at least one motor which acts on a drive shaft. A control device is communicatively connected to an encoder system, wherein the encoder system is directly or indirectly coupled to the drive shaft. The method is characterized by the steps of first receiving from the control device a signal for switching the on-load tap-changer. In a next step, the control device determines whether switching to a current tap was performed from an upward direction or a downward direction. Then, it is determined whether to switch to the next tap in an upward or downward direction. In a subsequent step, one of a plurality of travel profiles is selected for the drive system of the on-load tap-changer on the basis of the determination in the previous step. The switchover is then carried out on the basis of the selected travel profile(s).

In a final step, the switchover is carried out and monitored by means of the drive system according to the selected travel profile.

According to a preferred embodiment of the invention, a plurality of travel profiles can be saved in the control device. A memory can be assigned to the control device for saving the travel profiles.

Operating the switchover in an on-load tap-changer according to the concept of using a plurality of travel profiles has the advantage that a gentler switchover is possible, since the switchover can be adapted to the mechanical conditions of the on-load tap-changer. This means that mechanical components can also be protected. In addition, the switchover can be designed flexibly. Furthermore, special design features such as freewheels in the selector of the on-load tap-changer are taken into account by means of corresponding travel profiles.

According to exemplary embodiments, a first possible travel profile can describe a switchover of the on-load tap-changer in an upward direction. In this case, before the switchover, it is determined whether to switch from the tap to the next higher tap. During the current switchover, it is determined whether to switch from the next higher tap to the following even higher tap.

According to exemplary embodiments, a second possible travel profile can describe a switchover of the on-load tap-changer in a downward direction. In this case, before the switchover, it is determined whether a switch was performed from the tap to the next lower tap. During the current switchover, it is checked whether to switch from the next lower tap to the even lower tap.

In both cases, the selected travel profile causes the drive shaft of the on-load tap-changer to rotate by an integer multiple of 180 degrees. Preferably, the drive shaft of the on-load tap-changer rotates through 180 degrees or even 360 degrees. It may also be that the drive shaft can rotate further than 360 degrees. Depending on the switch type and drive system, the drive shaft is rotated according to an appropriate value.

According to a possible embodiment of the invention, a third possible travel profile may describe a switchover of the on-load tap-changer in an upward direction. In this case, before the switchover, it is checked whether a switch was performed from the tap to the next lower tap during a previous switchover. During the current switchover, the current lower tap is then switched back to the higher tap, taking into account a freewheel of the on-load tap-changer.

According to a possible embodiment, a fourth possible travel profile may describe a switchover of the on-load tap-changer in a downward direction. Before the switchover, it is checked whether a switch from the tap to the next higher tap was performed during a previous switchover. During the current switchover, the higher tap is switched back to the lower tap, taking into account a freewheel of the on-load tap-changer.

Exemplary travel profiles are designed in such a way that they rotate the drive shafts by an integer multiple of 180 degrees. In addition, there is a further angular amount which is rotated through so that the freewheel of the gear unit is taken into account. Depending on the switch type and drive system, the drive shaft is rotated according to a corresponding value and the value of the freewheel is added to it.

According to a possible further embodiment, a fifth travel profile can be designed in such a way that a travel profile from a tap to a first next higher tap to be approached or a first next lower tap is combined with at least one further travel profile. Based on the combination, at least one further next higher tap or at least one further next lower tap can be approached. The travel profiles are assigned before the drive system is put into operation.

The current tap can be determined by means of the control device. The determined current tap is used to select the required travel profile or the required travel profiles. In contrast to other embodiments, not only the directions are used to select a travel profile, but also the positions of the on-load tap-changer, i.e., the taps.

Each of the travel profiles can be formed from two variables and can be represented as an nth-order polynomial function in a two-dimensional Cartesian coordinate system.

The stored travel profiles can be retrieved from the control device or a control unit of the drive system.

The drive system for an on-load tap-changer according to an embodiment of the present invention for carrying out the method comprises a drive shaft which connects the drive system to the on-load tap-changer. A motor is used to drive the drive shaft. A feedback system is configured to determine a position of the drive shaft. A feedback signal is generated based on the determined position. A control device is configured to act on the operation of the motor depending on a selected travel profile and the feedback signal.

Exemplary control devices comprise a control unit and a power section. The power section is used to supply power to the motor. The at least one travel profile is saved in a memory of the power section. The control unit selects a travel profile and the power section acts on the motor according to the travel profile.

The improved concept with the travel profiles is based, among other things, on the idea that before an on-load tap-changer is switched or actuated, a travel profile with which the switchover is carried out is selected for the drive system. It should first be determined in which position (tap) the on-load tap-changer was previously and in which position (tap) it is to be switched. In this way, a corresponding travel profile is selected for the drive system for the next switchover.

In addition, it can also be determined where the on-load tap-changer is located in a switching sequence, i.e., in which position or tap position (tap) it is located. The addition of the switching directions with the actual position can also be used in special cases for the selection of a travel profile. By selecting a travel profile tailored to a special tap change or switchover, the safety of the system as a whole is increased. Furthermore, mechanical components are not unnecessarily stressed. In addition, the speed of the switchovers can be optimized and, if possible, even increased.

Knowledge of the switching directions (past and future), in conjunction with the current tap position, makes it possible to select a travel profile optimally designed for the next switchover. Mechanical freewheels, clearances and special features in the actuation sequence are thus individually taken into account.

According to at least one embodiment of the invention, the switching signal is triggered by a voltage regulator required for controlling a tapping transformer, manual input, or by an external signal.

According to at least one embodiment of the invention, the control device has a memory in which each travel profile and the assignment of the travel profile to a tap change as well as the current tap position are stored.

According to at least one embodiment of the invention, the control device has a control unit and a power section, wherein the assignment of the travel profile to a tap change and the current tap position are stored in a memory of the control unit and the travel profiles are stored in a memory of the power section.

The drive system according to exemplary embodiments of the present invention is able to drive the drive shaft in a targeted manner, i.e., according to a previously selected travel profile. The travel profile not only specifies a speed or torque; the travel profile also specifies the point in time or the position of the drive shaft, and which torque or which speed is implemented at the drive shaft. By using such travel profiles, specific sections of a switching operation of the switch can be influenced. The feedback signal is used to compare the current position of the drive shaft, i.e. the actual value, with the travel profile, i.e. the desired value. This makes the system flexible and safe.

The concept of the "drive shaft position" can include measurement variables from which the position of the drive shaft can be unambiguously determined, and if necessary within a tolerance range.

According to at least one embodiment, the drive system serves to drive a shaft of the switch, on-load tap-changer or a corresponding component of the on-load tap-changer. This causes the on-load tap-changer to carry out one or more operations, for example, a switchover between two winding taps of an item of equipment or parts of the switchover, such as a diverter switch operation, a selector actuation, or a change-over selector actuation.

According to at least one embodiment, the drive shaft is connected directly or indirectly, in particular via one or more gear units, to the on-load tap-changer, in particular to the shaft of the on-load tap-changer.

According to at least one embodiment, the drive shaft is connected directly or indirectly, in particular via one or more gear units, to the on-load tap-changer, in particular to the shaft of the on-load tap-changer.

According to at least one embodiment, the drive shaft is connected directly or indirectly, in particular via one or more gear units, to the motor, in particular to a motor shaft of the motor.

According to at least one embodiment, a position, in particular an absolute position, of the motor shaft corresponds to a position, in particular an absolute position, of the drive shaft. This means that the position of the drive shaft can be unambiguously deduced from the position of the motor shaft, if necessary within a tolerance range.

According to at least one embodiment, the action includes open-loop control, closed-loop control, braking, acceleration, or stopping of the motor. For example, the closed-loop control may include position control, speed control, acceleration control, or torque control. At least in the case of such closed-loop controls, the drive system can be said to be a servo drive system.

According to at least one embodiment, the drive system comprises a monitoring unit, which is configured to monitor the one or more operations of the switch on the basis of the feedback signal. The monitoring comprises in particular a monitoring as to whether individual operations or parts thereof are carried out properly, in particular within predefined time windows.

According to at least one embodiment, the control device comprises a control unit and a power section for open-loop-controlled or closed-loop-controlled power supply to the motor. The control unit is configured to control the power section. At least one travel profile is saved in the power section, which travel profile is formed from two variables and can be represented as an nth-order polynomial function in a two-dimensional Cartesian coordinate system.

According to at least one embodiment, the power section is designed as a converter or servo converter or as an equivalent electronic, in particular fully electronic, unit for drive machines.

According to various embodiments, the control device contains all or part of the feedback system.

The absolute position of the drive shaft can be compared by the control device, for example. If there is a significant deviation, the control device can output an error message or initiate a safety measure.

According to at least one embodiment, the feedback system is configured to determine a rotor position of the motor and to determine a value for the position of the drive shaft, depending on the rotor position.

According to at least one embodiment, the rotor position is an angular range in which a rotor of the motor is located, as necessary combined with a number of complete rotations of the rotor.

Depending on the design, in particular the number of pole pairs, of the rotor, the position or absolute position of the motor shaft can thus be determined accurately to at least 180°, for example by the control device. By the reduction by means of one or more gear units, the achievable accuracy of the position of the drive shaft is significantly greater. In this case, the evaluation by the control device corresponds to a virtual encoder function, so to speak. Even in the event of a complete failure of an absolute encoder of the feedback system, at least one emergency operation can therefore be maintained and/or the on-load tap-changer can be brought into a safe position.

According to at least one embodiment, the feedback system includes an absolute encoder configured and arranged to detect the absolute position of the drive shaft or an absolute position of a further shaft connected to the drive shaft and to generate at least one output signal based on the detected position. The feedback system is configured to determine a value for the position of the drive shaft on the basis of the at least one output signal.

According to at least one embodiment, the absolute encoder is directly or indirectly attached to the motor shaft, the drive shaft or a shaft coupled thereto.

According to at least one embodiment, the absolute encoder comprises a multi-turn encoder or single-turn encoder.

According to at least one embodiment, the absolute encoder is configured to detect the position of the drive shaft or the position of the further shaft on the basis of a sampling method.

According to at least one embodiment, the sampling method includes an optical, a magnetic, a capacitive, a resistive, or an inductive sampling method.

According to at least one embodiment, the feedback system includes a combination of an absolute encoder and an auxiliary contact, which in the combination are configured and arranged to detect the absolute position of the drive shaft or an absolute position of a further shaft connected to the drive shaft and to generate at least one output signal based on the detected position. The feedback system is configured to determine a value for the position of the drive shaft on the basis of the at least one output signal.

According to at least one embodiment, the absolute encoder and the auxiliary contact are directly or indirectly attached to the motor shaft, the drive shaft, or a shaft coupled thereto.

According to at least one embodiment, the absolute encoder is embodied as a single-turn encoder or incremental encoder or virtual encoder. The auxiliary contact is embodied as at least one microswitch or resolver or sin-cos encoder.

According to at least one embodiment, the absolute encoder and the auxiliary contact are configured to detect the position of the drive shaft or the position of the further shaft on the basis of a sampling method.

According to at least one embodiment, the sampling method includes an optical, a magnetic, a capacitive, a resistive, or an inductive sampling method.

According to at least one embodiment, the travel profile can be formed from two variables and represented as an nth-order polynomial function in a two-dimensional Cartesian coordinate system.

According to at least one embodiment, the variables are direct variables or indirect variables of the drive system, for example, time, angle of rotation of the drive shaft, current, voltage, speed, torque, or acceleration.

According to at least one embodiment, a variable can be represented by in each case one axis of the coordinate system.

According to at least one embodiment, the control device can act on a second motor.

According to at least one embodiment, the control device can comprise a second power section which acts on a second motor.

According to at least one embodiment, the control device can act on a second motor in such a way that it runs the travel profile of the actual value of the feedback system of the first motor.

According to at least one embodiment, the on-load tap-changer comprises a diverter switch and a selector, as well as a double reversing change-over selector or a reversing change-over selector or a change-over selector.

In the following, the invention and its advantages are explained in greater detail on the basis of the appended schematic drawings. These show:

Identical reference signs may be used for elements of the invention that are identical or functionally identical. The figures merely illustrate exemplary embodiments of the invention without, however, limiting the invention to the illustrated exemplary embodiments.

FIG. 1 shows a schematic diagram of an exemplary interaction of an on-load tap-changer 8 with the taps N1, N2, . . . , NN of a tap winding 20 of a transformer 9. A motor 12 is provided for driving a selector 18 and the diverter switch 17, which motor acts on the selector 18 and the diverter switch 17, i.e., the on-load tap-changer 8, via a gear unit 15. Via a motor shaft 14 and a drive shaft 16, the motor 12 acts on the on-load tap changer 8 to switch in an upward direction N+ from a tap NJ to the next higher tap NJ+1 or in a downward direction N− from a tap NJ to the next lower tap NJ−1 of the tap winding 20 of the transformer 9.

Figure 2:
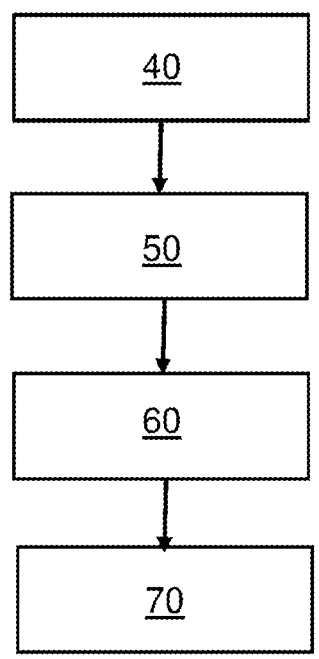
FIG. 2 is an exemplary process sequence for the actuation of an on-load tap-changer, according to an improved concept.
Figure 3:
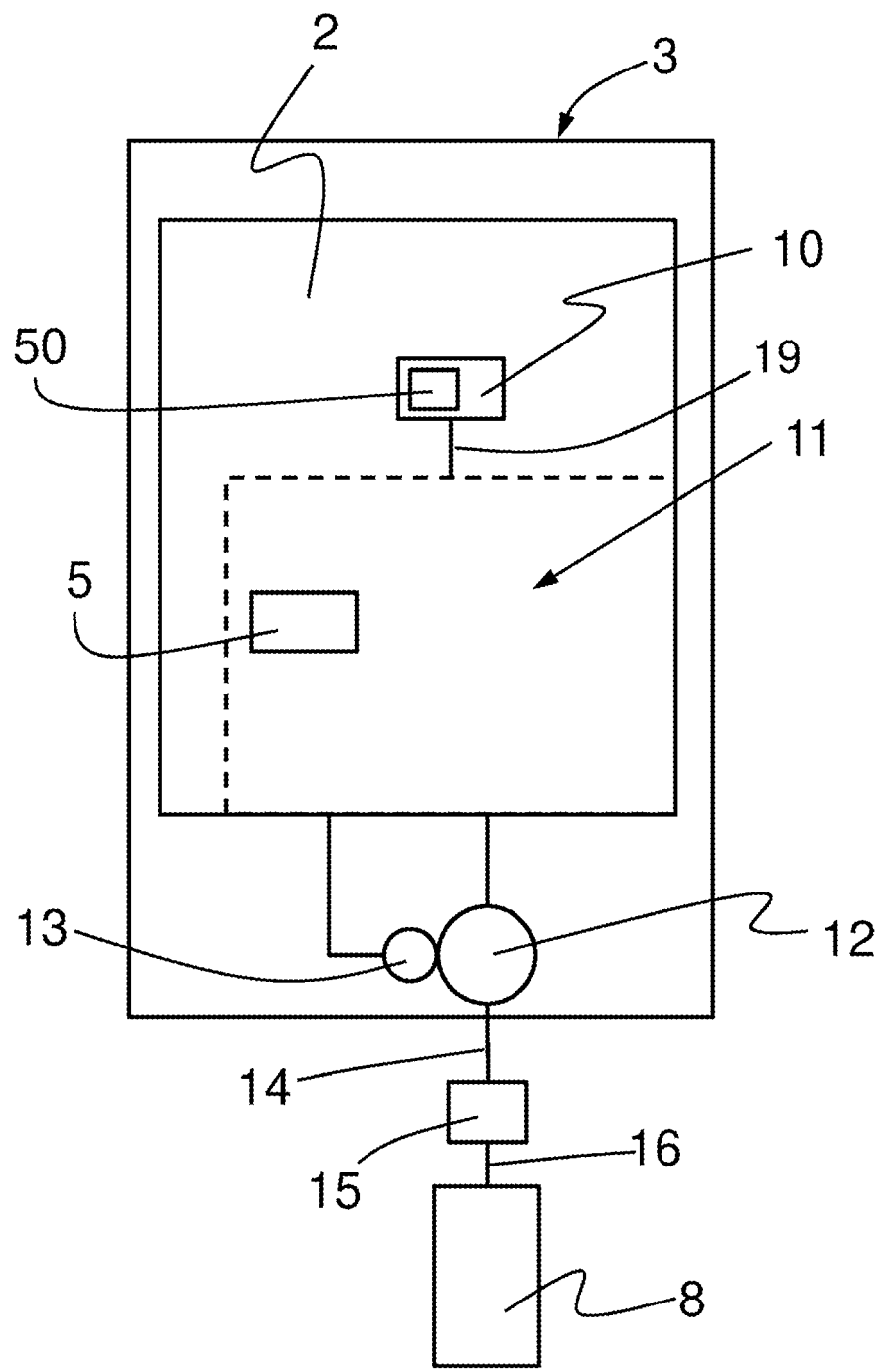
FIG. 3 is a schematic representation of an exemplary embodiment of an on-load tap-changer with a drive system, according to an improved concept.

FIG. 2 shows an exemplary process sequence for the actuation of the on-load tap-changer 8 by means of a drive system 3 according to the invention (see FIG. 3). In the first step 40, a signal for "switching" is first given to the control device 2. This signal is generated by a voltage regulator, a monitoring system or by manual input. This means that the on-load tap-changer 8 must be actuated, for example, in order to adjust the voltage of the transformer 9 (see FIG. 1). However, adjustment operations during maintenance are also conceivable, i.e., actuation of the on-load tap-changer 8 in service mode. In the next step 50, the control device 2 checks in which direction (upward direction N+ or downward direction N−) the transformer 9 is switched, i.e. in which tap (N1, N2, . . . , NN) or tap position. Furthermore, it is checked from which direction (upward direction N+ or downward direction N−), i.e., which position or tap position, the switch was performed to the current position (tap NJ). The order of these steps is arbitrary. In the next step 60, a travel profile 22 corresponding to the result is selected and, with this travel profile 22, the on-load tap-changer 8 is actuated in the following step 70.

This simplified method allows simple on-load tap-changers 8 to be operated with only two or four travel profiles 22.

In an embodiment, a first possible travel profile 22 describes a switchover of the on-load tap-changer 8 in an upward direction N+, if the switch was not in a downward direction N− at the beginning. In other words, before the switchover, a switch was performed from tap NJ to tap NJ+1, and now a switch is to be performed from tap NJ+1 to tap NJ+2. Thus, switching takes place in the same direction, i.e. the upward direction N+. Here, the drive shaft 16 of the on-load tap-changer 8 preferably rotates through 180 degrees or even 360 degrees. However, the drive shaft 16 can also rotate further than 360 degrees.

The second possible travel profile 22 describes a switchover of the on-load tap-changer 8 in the downward direction N−, if the opposite switching direction was not switched at the beginning. In other words, before the switchover, the tap NJ+2 was switched to the tap NJ+1, and now a switch is to be performed to the tap NJ. This means that switching takes place in the same direction. Here, the drive shaft 16 preferably rotates through 180 degrees or even 360 degrees. However, the drive shaft 16 can also rotate further than 360 degrees.

If, for example, mechanical freewheels are installed in the on-load tap-changer 8 and are activated when changing from the downward direction N− to the upward direction N+ or vice versa (i.e., from a first switching direction to a second switching direction, wherein the latter is opposite to the first switching direction), these freewheels must be taken into account during the switchover. These freewheels are components of the mechanical systems of the on-load tap-changer 8, for example because of final locking devices, in the spring energy accumulator or in the selector 18. For this purpose, a third and a fourth travel profile 22 are saved in the control device 2. These travel profiles 22 have characteristics that differ from those of the first and second travel profiles 22, respectively. For example, the drive shaft 16 rotates through more degrees in the third and fourth travel profiles 22 than in the first and second travel profiles 22 of the previous tap-change operation. In the case of a switchover carried out with a rotation of the drive shaft through 180 degrees, an amount that takes into account the freewheel must be included. The drive system 3 then rotates the drive shaft 16 through more than just 180 degrees. In this case, the amount of freewheel is added to the basic amount required to carry out a tap-change operation. If the subsequent tap-change operation is again in the same direction (downward direction N− or upward direction N+), the corresponding travel profile 22 is used.

The first and second or third and fourth travel profiles 22 may be identical except for their signs. In principle, the travel profiles 22 can differ from each other in each variable. They can, for example, run faster or slower. They can be partly identical to each other, but can be supplemented by a further portion.

The travel profile 22 may be selected on the basis of the switching direction (downward direction N− or upward direction N+) of the last tap-change operation and the switching direction (downward direction N− or upward direction N+) of the next tap-change operation.

In the case of more complex on-load tap-changers 8, however, the actual position or tap position of the tap in which the on-load tap-changer 8 is located must also be taken into account. In step 50, the control device 2 then additionally checks in which position or tap position of the tap the on-load tap-changer 8 is currently located. Furthermore, it is checked into which position or to which tap it is to be switched and from which position or tap it was switched into the current position. The order of these steps is arbitrary. In the next step 60, a travel profile 22 corresponding to the result is selected and, with this travel profile 22, the on-load tap-changer 8 is actuated in the following step 70.

A fifth travel profile 22 can also be provided here. This may be necessary for so-called pass-through positions of the on-load tap-changer 8 or for asymmetrically constructed on-load tap-changers 8. Here, the control device 2 recognizes that the next tap-change operation is a so-called pass-through position. This means that at the first tap NJ+1 or NJ−1 to be approached with the travel profile 22, no stop is to be made. The selected tap NJ+X or NJ−X (where X is equal to or greater than 2) to be reached can only be reached by at least one further travel profile 22. Such a switchover is recognized by assigning the tap change from a certain tap NJ to another certain tap NJ+X or NJ−X or switching direction (downward direction N− or upward direction N+) to at least one further travel profile 22. This assignment is made before the drive system 3 is put into operation and is saved in a memory 5 of the control device 2 or control unit 10. This travel profile 22 also differs in its characteristics from the first and second travel profiles 22. In the so-called pass-through position, the drive shaft 16 must rotate many times more often than in the case of a normal switchover (from a current tap NJ to the tap NJ+1 or NJ−1) of an on-load tap-changer 8. This travel profile 22 is thus assigned to a specific switchover between two specific taps NJ and NJ+X or NJ and NJ−X.

In principle, the combination of determining the switching directions (past and future) and the actual position or tap position allows a travel profile 22 explicitly tailored to that tap-change operation to be selected and executed.

FIG. 3 shows a schematic representation of an exemplary embodiment of a drive system 3 for an on-load tap-changer 8. The drive system 3 is connected to the on-load tap-changer 8 via a drive shaft 16. The drive system 3 includes a motor 12 which can drive the drive shaft 16 via a motor shaft 14 and, optionally, via a gear unit 15. A control device 2 of the drive system 3 comprises a power section 11, which includes, for example, an inverter for open-loop-controlled or closed-loop-controlled power supply to the motor 12. A control unit 10 is connected to control the power section 11, for example, via a bus 19. The drive system 3 comprises an encoder system 13, which serves as a feedback system, or is a part of the feedback system, and is connected to the power section 11. Further, the encoder system 13 is directly or indirectly coupled to the drive shaft 16.

The encoder system 13 is configured to detect at least a first value for a position, in particular an angular position, for example an absolute angular position, of the drive shaft 16. For this purpose, the encoder system 13 can comprise, for example, an absolute encoder, in particular a multi-turn absolute encoder, which can be attached to the drive shaft 16, the motor shaft 14 or a further shaft of which the position is unambiguously linked to the absolute position of the drive shaft 16. The position of the drive shaft 16 can be unambiguously determined from the position of the motor shaft 14, for example, via a transmission ratio of the gear unit 15.

The feedback system is configured to detect a value for the position of the drive shaft 16.

The control device 2, in particular the control unit 11 and/or the power section 12, is configured to control the motor 12 in an open-loop or closed-loop fashion depending on a feedback signal generated by the feedback system, based on the value.

The power section 11 has a memory 5 with saved travel profiles 22. The encoder system 13, which is used as feedback system, reports the position of the drive shaft 16 to the power section 11 and thus monitors whether the drive shaft 16 is moving correctly along the travel profile 22 or is adhering to the specified parameters.

A plurality of travel profiles 22 are saved in the power section 11. One of the travel profiles 22 is selected via the control unit 11 on the basis of the method described in FIG. 1.

Figure 4A:
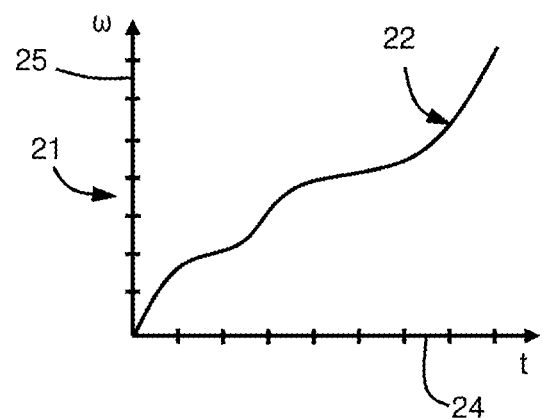
FIG. 4a is a travel profile for the drive system according to an exemplary embodiment of the present invention, showing the angle of rotation of the drive shaft as a function of time.
Figure 4B:
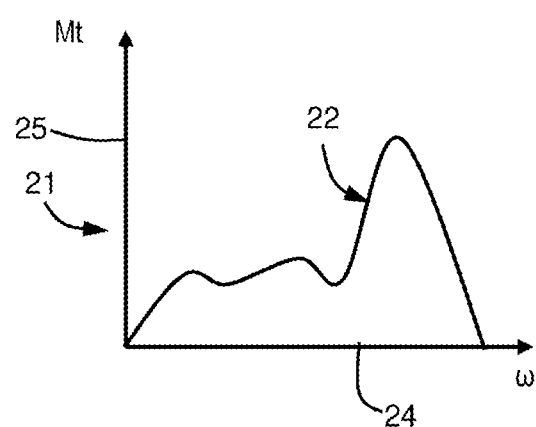
FIG. 4b is a travel profile for the drive system according to an exemplary embodiment of the present invention, which shows the torque as a function of the angle of rotation of the drive shaft.

FIGS. 4a and 4b show possible travel profiles 22 of the motor 12 for a switching operation of the on-load tap-changer 8. Here, the travel profiles 22 are shown as examples, in each case as an nth-order polynomial function with two variables, which are plotted in a two-dimensional Cartesian coordinate system 21. In the case of the travel profile 22 shown in FIG. 4a, the time t, i.e., how long the drive shaft 16 actuates the motor 12, is plotted on the X-axis 24. On the Y-axis 25, the angle of rotation ω of the drive shaft 16 is plotted. The variables plotted on axes 24, 25 in FIG. 4a are examples only and should not be construed as limitations of the invention. The variables plotted on the X-axis 24 and the Y-axis 25 may be direct variables or indirect variables of the drive system 3. Direct variables may be, for example, the time t, an angle of rotation ω of the drive shaft 16, current or voltage. Indirect variables may be speed, torque, acceleration or the like.

FIG. 4b shows a possible travel profile 22 of the motor 12 for a switching operation of the switch 1. Here, the indirect variable of the torque M(t) is plotted as a function of the angle of rotation ω and is represented as an nth-order polynomial function. In the travel profile 22 shown in FIG. 4b, the angle of rotation ω is plotted on the X-axis 24. The torque M(t) acting on the drive shaft 16 is plotted on the Y-axis 25.

The travel profile 22 specifies a desired value which the drive shaft 16 should achieve. When the travel profile 22 is run, the actual value detected by the feedback system can deviate from the desired value. Depending on the predetermined possible deviation of the actual value from the desired value, the action on the motor 16 can either be aborted or continued. The deviation can either be set manually or determined by means of a learning process.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

2 Control device
3 Drive system
5 Memory
8 On-load tap-changer
9 Transformer
10 Control unit
11 Power section
12 Motor
13 Encoder system
14 Motor shaft
15 Gear unit
16 Drive shaft
17 Diverter switch
18 Selector
19 Bus
20 Tap winding
21 Cartesian coordinate system
22 Travel profile
24 X-axis
25 Y-axis
40 Step
50 Step
60 Step
70 Step
N+ Upward direction
N− Downward direction
N1, N2, . . . , NN Tap
t Time
M(t) Torque
ω Angle of rotation

The invention claimed is:

1. A method for carrying out a switchover of an on-load tap-changer using a drive system, the drive system comprising at least one motor which acts on a drive shaft, a control device and an encoder system which is directly or indirectly coupled to the drive shaft, the method comprising:
   receiving a signal for switching the on-load tap-changer from the control device;
   determining, using the control device, whether switching to a current tap was performed from an upward direction or downward direction, and whether switching will be performed to a next tap in the upward direction or downward direction;
   selecting, on the basis of the determination, a travel profile of a plurality of travel profiles for the drive system of the on-load tap-changer, on the basis of which, the switchover is carried out; and
   carrying out and monitoring the switchover by the drive system according to the selected travel profile.

2. The method as claimed in claim 1, wherein the plurality of travel profiles are saved in the control device.

3. The method as claimed in claim 1, wherein the travel profile, of the travel profiles, describes a switchover of the on-load tap-changer in an upward direction, wherein, before the switchover, it is determined whether the on-load tap-changer was switched from the tap to a next higher tap, and, during the current switchover, whether to switch from the next higher tap to the following even higher tap.

4. The method as claimed in claim 1, wherein the travel profile, of the travel profiles, describes a switchover of the on-load tap-changer in a downward direction, wherein, before the switchover, it is determined whether a switch was performed from an even higher tap to the next lower tap, and, during the current switchover, it is checked whether to switch from the next lower tap to the even lower tap.

5. The method as claimed in claim 3, wherein the travel profile describes rotating the drive shaft by an integer multiple of 180 degrees.

6. The method as claimed in claim 1, wherein the travel profile, of the travel profiles, describes a switchover of the on-load tap-changer in an upward direction, wherein, before the switchover, it is checked whether a switch was performed from the tap to the next lower tap, and, during the current switchover, it is checked whether to switch back to the next higher tap from the tap, taking into account a freewheel of the on-load tap-changer.

7. The method as claimed in claim 6, wherein the travel profile describes rotating the drive shaft by an integer multiple of 180 degrees plus a further angular amount to take into account the freewheel of a gear unit of the on-load tap-changer.

8. The method as claimed in claim 1, wherein the travel profile, of the travel profiles, describes a switchover of the on-load tap-changer in a downward direction, wherein, before the switchover, it is checked whether a switch was performed from the tap to the next higher tap, and, during the current switchover, it is checked whether to switch back to the next lower tap from the tap, taking into account a freewheel of the on-load tap-changer.

9. The method as claimed in claim 1, wherein the travel profile, of the travel profiles, is designed such that a first travel profile from a tap to a first next higher tap to be approached or a first next lower tap is combined with at least one further travel profile, in order to approach at least one further next higher tap or at least one further next lower tap, wherein the travel profiles are assigned before the drive system is put into operation.

10. The method as claimed in claim 1, wherein the current tap is determined by means of the control device and is used to select the required travel profile.

11. The method as claimed in claim 1, wherein each of the travel profiles is formed from two variables and is representable as an nth-order polynomial function in a two-dimensional Cartesian coordinate system.

12. The method as claimed in claim 1, wherein the travel profiles are retrieved from the control device or a power section of the drive system.

13. The method as claimed in claim 1, wherein the travel profiles comprise at least four different travel profiles, and each of the travel profiles specifies points in time or angular positions of the drive shaft and which torque or which speed is implemented at each of the points in time or angular positions of drive shaft.

14. A drive system for carrying out a switchover of an on-load tap-changer, the drive system comprising:
   a drive shaft which is configured to connect the drive system to the on-load tap-changer;
   a motor that is configured to drive the drive shaft;

a controller and a feedback system which is directly or indirectly coupled to the drive shaft, the controller being configured to:

determine whether switching to a current tap was performed from an upward direction or downward direction, and whether switching will be performed to a next tap in the upward direction or downward direction;

selecting, on the basis of the determination, a travel profile of a plurality of travel profiles for the drive system of the on-load tap-changer, on the basis of which, the switchover is to be carried out; and act on the operation of the motor depending on the selected travel profile.

15. The drive system as claimed in claim 14, wherein the control device comprises a control unit and a power section, wherein the power section is configured to supply power to the motor, wherein at least one travel profile is stored in a memory of the power section, wherein the control unit is configured to select the selected travel profile from the at least one travel profile stored in the memory, and wherein the power section is configured to act on the motor according to the selected travel profile.

16. The drive system as claimed in claim 14, wherein the feedback system comprises an encoder system which is configured and arranged to detect the position of at least the drive shaft.

17. The drive system as claimed in claim 16, wherein the encoder system comprises an absolute encoder and an auxiliary contact, which in combination are configured and arranged to detect the absolute position of at least the one drive shaft.

18. The drive system as claimed in claim 17, wherein the absolute encoder and the auxiliary contact are directly or indirectly attached to the motor shaft, the drive shaft or a shaft coupled thereto.

19. The drive system as claimed in claim 17, wherein the absolute encoder is embodied as a single-turn encoder or incremental encoder or virtual encoder and the auxiliary switch is embodied as at least one microswitch or resolver or sin-cos encoder.

20. The drive system as claimed in claim 17, wherein the absolute encoder and the auxiliary contact are configured to detect the position of the drive shaft or the position of the further shaft on the basis of a sampling.

* * * * *